Patented Jan. 10, 1933

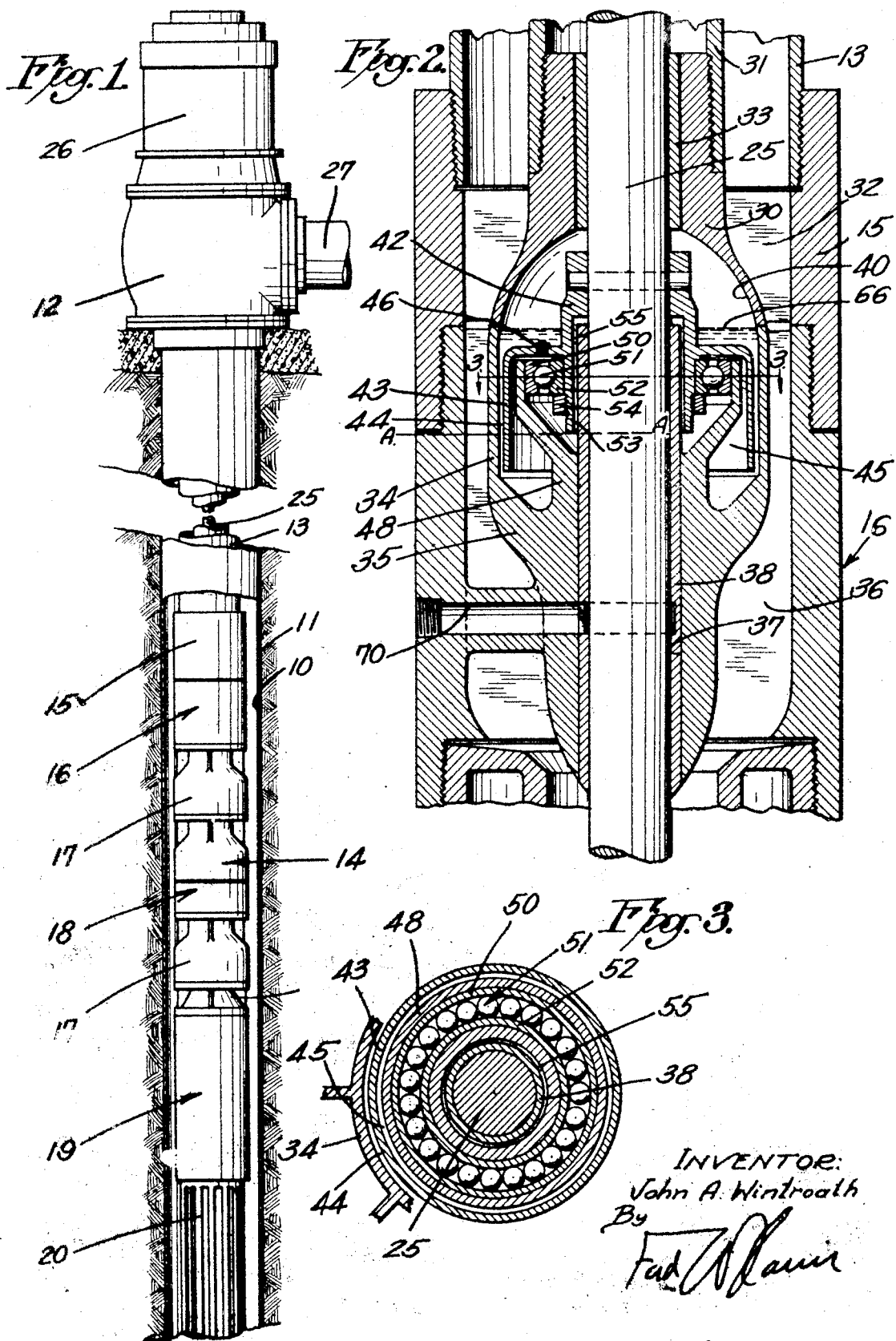

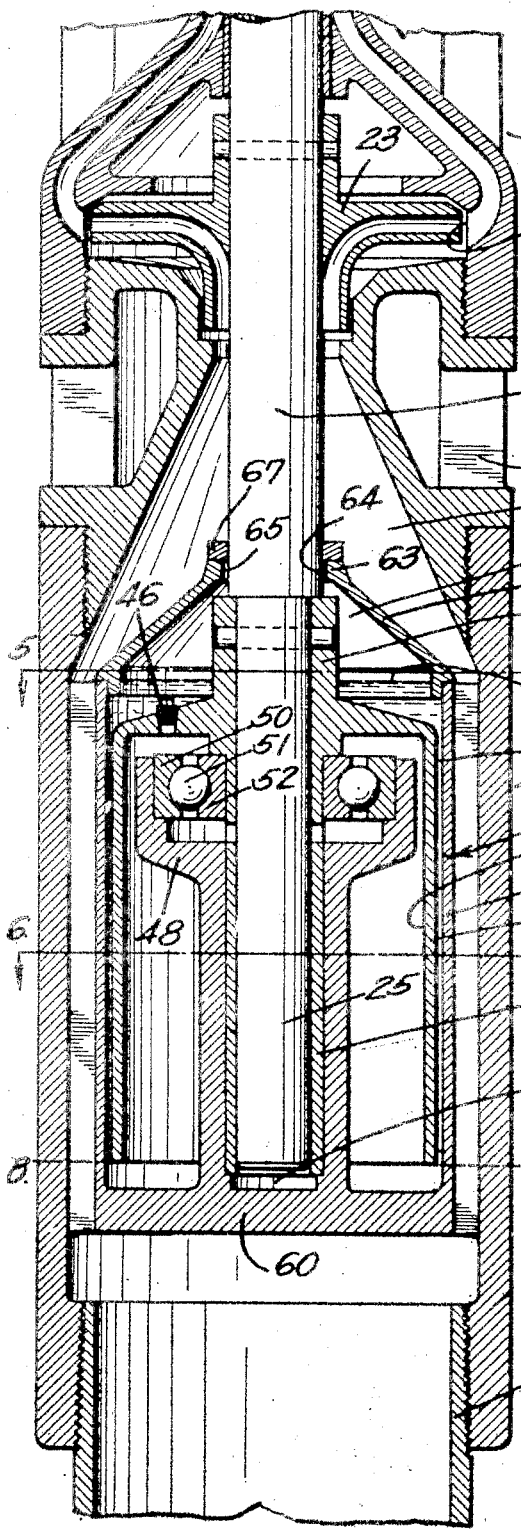

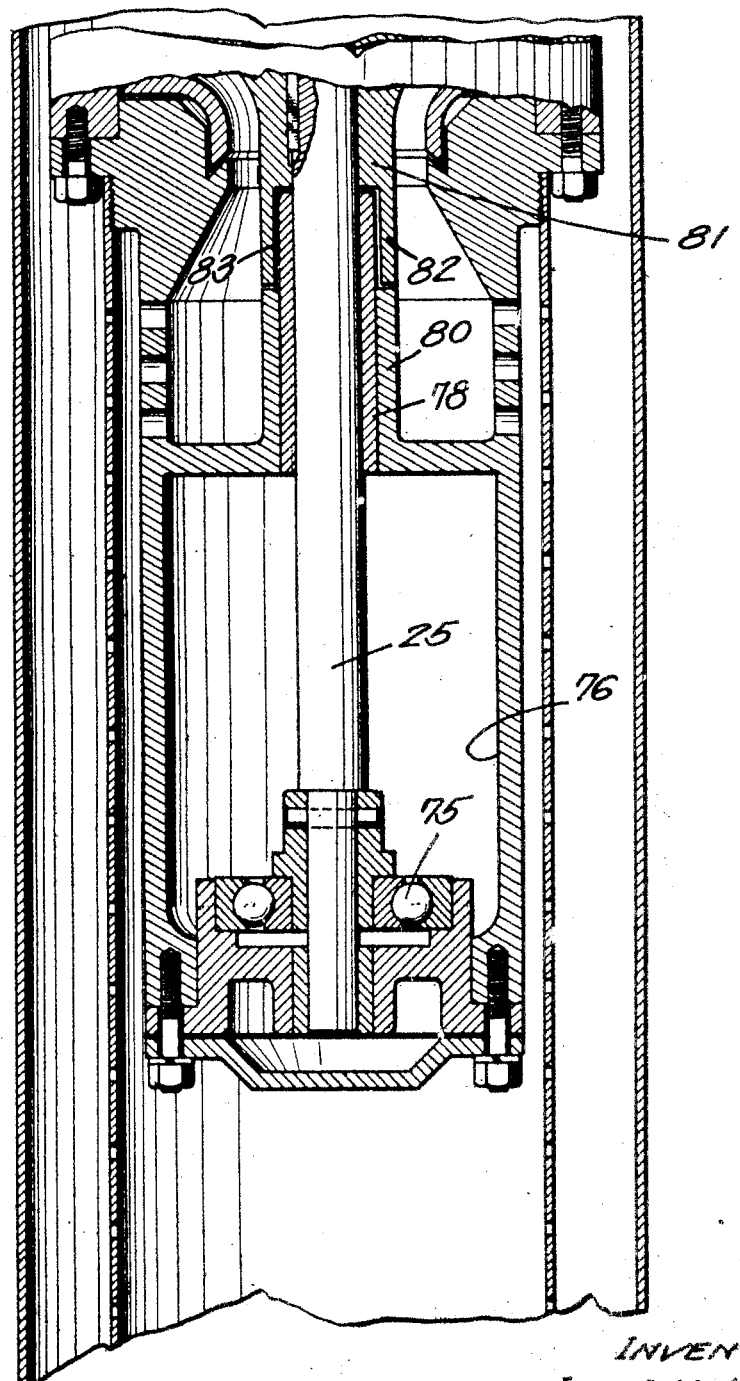

1,893,921

UNITED STATES PATENT OFFICE

JOHN A. WINTROATH, OF LOS ANGELES, CALIFORNIA, ASSIGNOR TO WINTROATH PUMPS, LTD., OF ALHAMBRA, CALIFORNIA, A CORPORATION OF CALIFORNIA

LUBRICATION FOR SUBMERGED BEARINGS

Application filed March 21, 1928. Serial No. 263,254.

My invention relates to bearing structures, and more particularly to a bearing structure which will successfully operate submerged in a fluid without allowing this fluid to reach the bearing surfaces.

In the deep-well pumping art, it is customary to install a turbine pump unit suspended in a well on a discharge casing which is in turn supported at the surface of the ground by a suitable pump head. This pump head includes a means for rotating a line shaft which extends downward inside the discharge casing to the pump unit. One or more impellers are secured to this line shaft, these impellers being adapted to operate in impeller chambers of the pump unit to force well-fluid upward through the discharge pipe to the surface of the ground. It is necessary to suitably journal the line shaft, both in the pump unit and throughout its length. Bearings at present in use are open to the objection that well-fluid may have access to the bearing surfaces. Inasmuch as this well-fluid usually has poor lubricating qualities, and often carries in suspension foreign particles, these bearings are often subject to considerable wear and require frequent replacement.

It is an object of my invention to provide a bearing structure which may be operated submerged in a fluid, this structure preventing any of the fluid from reaching the bearing surfaces.

In practice, I prefer to fill the bearing structure of my invention with a lubricating medium having a lower specific gravity than the fluid to be pumped from the well. The bearing itself is enclosed in an inverted cup secured to the shaft. Any fluids entering the bearing structure will fall to the bottom thereof outside the cup, but cannot rise inside the cup due to the lubricating medium entrapped therein.

It is an object of my invention to provide a bearing mounted in an inverted cup, the inside of said cup being filled with a lubricating medium so as to be indisplaceable by any fluid which might enter the bearing structure.

Such a bearing offers a trap for any sediment, allowing this sediment to collect below the lip of the inverted cup.

It is an object of my invention to provide a bearing structure, the bearings of which are not injured by a small amount of sediment entering the bearing structure.

The usual form of bearing used in the deep-well turbine art is of the sleeve type. Often these sleeve bearings operate with unequal pressures at the ends thereof so that there is a tendency for fluid to flow axially therethrough. This is especially the case in the bearings in a pump unit which are ordinarily difficult to properly lubricate and which have access in one way or another to the fluid being pumped. This fluid wears the bearing surfaces and often causes not only a poor journalling action, but also a leakage of fluid through the bearing. This leakage is a material factor in pumps of low capacity, constituting a relatively high percentage of the pump output.

It is an object of my invention to provide a bearing structure having a long life.

A further object of my invention is to provide a bearing structure which will prevent a leakage of the pumped fluid therethrough.

Further objects and advantages of my invention will be made evident hereinafter.

Referring to the drawings,—

Fig. 1 is a utility view showing a pump installation embodying the features of my invention.

Fig. 2 is a vertical sectional view of the bearing structure of my invention as applied to the upper end of a pump unit.

Fig. 3 is a cross-sectional view taken on the line 3—3 of Fig. 2.

Fig. 4 is a vertical sectional view of the bearing structure of my invention as applied to the lowermost bearing of a pump unit.

Fig. 5 is a sectional view taken on the line 5—5 of Fig. 4.

Fig. 6 is a sectional view taken on the line 6—6 of Fig. 4.

Fig. 7 is an alternative form of my invention.

Referring particularly to Fig. 1, I illustrate one use of my invention, this use being in the deep-well turbine art. In this art, it is customary to set a well casing 10 in a well 11. Extending downward through this casing, and supported by a pump head 12 is a discharge pipe 13 which carries at its lower end a pump unit 14. This pump unit is secured to the discharge pipe 13 by means of a collar 15. Suspended from the collar 15 is an upper bearing structure 16, to the lower end of which is secured one or more pump sections 17. In the event that a number of pump sections 17 are utilized, it is desirable to provide an intermediate bearing structure 18. Below the lowermost pump section 17 is a collar 18ª which joins the lowermost pump section to a lower bearing structure 19, as best illustrated in Figs. 4, 5, and 6. An intake pipe or screen 20 is threaded to the lower end of the lower bearing structure 19. Each of the pump sections 17 includes an impeller chamber 22 in which an impeller 23 is adapted to rotate. Each of the impellers 23 is secured to a line shaft 25 which extends upward through the discharge pipe 13 to the pump head 12 where it is directly connected to a motor 26 which rotates this shaft to draw well-fluid upward through the screen 20 and the discharge pipe 13, this fluid being discharged through a port 27 of the pump head 12.

It is necessary to frequently journal the line shaft 25 throughout its entire length in order to keep this shaft from whipping. The bearing structure of my invention is adapted to journal this line shaft both in the discharge pipe 13 and in the pump unit 14. For purposes of illustration, I show and describe my bearing structure as applied only to the upper and lower bearing structures 16 and 19 respectively, these bearing structures being shown in detail in Figs. 2 and 4 respectively.

Referring particularly to Fig. 2, the upper bearing structure 16 of my invention comprises a cap 30 which may be threadedly secured to the lower end of a shaft-enclosing tubing 31 which extends upward around the shaft 25. The use of such a shaft-enclosing tubing is, however, unnecessary if the bearings utilized in journalling this shaft are of my improved design. The cap 30 is centrally mounted in the collar 15 on fins 32, the space between these fins allowing a discharge of well-fluid. A sleeve bearing 33 is mounted in the cap 30 and is adapted to journal the line shaft 25, although this journalling action is not necessary to my invention.

The lower end of the cap 30 is adapted to snugly engage the upper end of a cylindrical wall 34 which is a part of an inner member 35 held in the upper bearing structure 16 on suitable fins 36 coinciding in position to the fins 32 so as to define a discharge passage between the inner member 35 and an outer member formed by the enclosing or outer walls of the bearing structure. The inner member 35 has a bore 37 therein, this bore tightly holding a sleeve bearing 38 in which the line shaft 25 may be journalled. The upper end of the sleeve 38 extends upward to a point adjacent the upper end of the cylindrical wall 34. The inner member 35 and the cap 30 cooperate to form a bearing chamber 40.

Secured to the line shaft 25 in this bearing chamber is a member 42 having an apron 43 extending downward and outward therefrom to a point adjacent the lower end of the bearing chamber 40. As best shown in Figs. 2 and 3, the lower end of the apron 43 is cylindrical in shape and is concentric with the interior of the bearing chamber 40, there being a clearance space 44 therebetween. This apron 43 comprises an inverted cup having a space 45 therein. This space 45 may be made to communicate with the upper end of the bearing chamber 40 through an opening normally closed by a plug 46. Extending upward from the inner member 35 is a sleeve member 48 which telescopes with the apron 43, extending upward into the space 45 thereof. The upper end of this sleeve member 48 is formed so as to receive an outer race 50 of a ball bearing 51. An inner race 52 of this ball bearing is clamped on a cylindrical member 53 of the member 42 by means of a nut 54. A clearance space 55 is provided between the innermost wall of the cylindrical member 53 and the sleeve 38 extending upward into the member 42.

The intermediate bearing structure 18 indicated in Fig. 1 is of a design very similar to that shown in Fig. 2. The details of the lower bearing structure 19 are slightly different, and this bearing structure is completely illustrated in Figs. 4, 5, and 6. The parts of the lower bearing structure 19 which correspond to those of the upper bearing structure 16 are similarly numbered. It should be noted that the shaft 25 does not extend through the lower bearing structure, but extends nearly to the bottom of the bearing chamber 40. The lower end of this bearing chamber is defined by a wall 60 extending across the inner member 35 and formed integrally therewith. A space 61 thus exists between the wall 60 and the lower end of the shaft 25, the sleeve 38 terminating in this space. No nut 54 is utilized in the lower bearing inasmuch as this lower bearing is usually of the thrust type and is adapted to take a downward thrust imposed thereon by the weight of the shaft and the hydraulic thrust of the impellers when in operation. The cap 30 of the lower bearing structure 19 is of slightly different construction from the cap 30 of the upper structure 16. The former cap has a boss 63 thereon, this boss having an opening 64 through which the shaft 25 extends. The opening 64 is slightly larger than the shaft, leaving a clearance space 65 therebetwen.

I provide a floating ring 67 which closely surrounds the shaft 25 for the purpose of partially closing the clearance space 65. The fluid being pumped passes upward through a channel 70 in a collar 18ª, and if it were not for the floating ring 67, this fluid would have free access to the interior of the bearing chamber through the clearance space 65. The floating ring 67 does not entirely eliminate any passage of well-fluid into the bearing chamber, but greatly impedes this flow and keeps therefrom large particles of foreign matter which might be carried by the well-fluid.

In assembling the pump of my invention, the member 42 of the lower bearing structure is first secured to the shaft and the shaft lowered into the lower bearing chamber 40, the bearing 51 therein carrying the weight of this shaft. With the plug 46 of the lower bearing structure 19 removed, a suitable lubricating medium is poured into the bearing chamber 40, completely filling this chamber to a level indicated by the numeral 66 of Fig. 4. The opening closed by the plug 46 allows the interior of the inverted cup member to be completely filled with this lubricating medium, and a portion of this medium may fill the space 61 below the shaft 25. This lubricating medium is preferably one having good lubricating properties, and having a density which is different from that of the fluid in the well.

In the embodiment shown, I prefer to utilize a good grade of oil, which may be of a non-emulsifying type if desired, this oil having a lower density than the fluid being pumped. The plug 46 is inserted and the cap 30 and the floating ring 67 are next installed. If desired the bearing chamber may be completely filled with the lubricating medium at this time through the clearance space 65. The collar 18ª and the lowermost pump section 17 are next assembled and secured to the lower bearing structure 19. The intermediate bearing structure 18 is then attached, this bearing being filled with a lubricating medium in a manner similar to the lower bearing structure 19. Still another pump section 17 is next threaded to the top of the section shaft assembly and the upper bearing structure 16 is secured thereto. This upper bearing structure is filled with a lubricating medium, the level thereof being indicated by the numeral 66 of Fig. 2, after which the cap 30 of the upper bearing structure is secured in place by attaching the collar 15 to the upper bearing structure 16.

The operation of my invention may best be illustrated with reference to Fig. 4. When the motor 26 is set into operation, the impellers 23 force well-fluid upward through the passages around the cylindrical wall 34 and the lower bearing structure 19. If the bearing chamber 40 of this bearing structure has been completely filled with lubricating medium, a small portion of the well-fluid may pass the floating ring 67 and displace a portion of the lubricating medium, due to the former having a greater density than the latter. Due to the difference in density, any well-fluid passing the floating ring 67 will drop downward and outward around the apron 43 through the clearance space 44. This action may continue until the well-fluid displaces sufficient lubricating medium so that the lower portion of the bearing chamber is filled with this well-fluid to a level indicated by the line B—B of Fig. 4, the line coinciding with the lowermost portion of the apron 43. At this time, it is possible for the space surrounding this apron to be entirely filled with well-fluid, but the space 45 inside the apron will contain no well-fluid, due to the fact that this well-fluid is of greater density than the lubricating medium. Any tendency of the well-fluid to rise above the level B—B in the space 45 will be stopped by compressing the body of lubricating medium held entrapped in the chamber 45. This lubricating medium has no means of escape due to the fact that the member 42 is secured to the shaft in fluid-tight relationship and there is no outlet to the space 61, so that any lubricating medium passing the sleeve 38 may not escape from this space. Thus, all of the well-fluid is prevented from reaching the bearing 51 of the lower bearing structure 19.

It should be noted that the fluid pressures inside and outside the bearing chamber are equal due to the floating ring 67 not forming a fluid-tight junction between the shaft and the boss 63.

The operation of the upper bearing structure 16 is substantially indentical except that any well-fluid entering the bearing chamber will drop to the lower portion thereof and may rise inside the inverted cup to a level indicated by the line A—A of Fig. 2, this level being defined by the lowermost edge of the cylindrical member 53 extending downward from the member 42. Well-fluid cannot rise above this level due to the body of lubricating medium entrapped thereabove. It should be noted that this level of well-fluid can only reach the line A—A by displacing a portion of the lubricating medium, this portion flowing downward between the shaft 25 and the sleeve 38, and escaping either through a by-pass 70 or into the pump section 17 immediately therebelow.

This by-pass 70 performs a well-known function in allowing any well-fluid rising between the lower end of the sleeve 38 and the shaft 25 to escape and reducing the tendency of the well-fluid to rise around the shaft into the bearing chamber.

As previously mentioned, the bearing chamber walls 30 and 34 form a substantially closed chamber about the lubricant containing space, and the bearing chamber serves to contain a liquid column extending above the lubricant space and above the top of the seal cup 43. The liquid column in the bearing chamber thus exerts by gravity a pressure on the lubricant in the bearing space to hold the lubricant in the upper interior of the seal cup. And it is to be noted that the bearing chamber serves to support or confine a liquid column independently of the well liquid at the outside of the chamber. Take for example in Fig. 4, should the level of the well liquid for any reason fall below the bearing chamber, the liquid column therein supporting the lubricant column within the seal cup would still be sustained at a predetermined level. In case the joints between the bearing chamber wall portions 30 and 34 were fluid tight, the liquid column in the bearing chamber would stand at the level of the upper overflow edge or opening of the cap section 30, and if the joint between the sections should not be fluid tight, the column would stand at a level indicated at 65. In either case however, the bearing chamber column will stand at a level above the level or top surface of the lubricant within the seal cup, and in the absence of the entry of any additional well liquid to the bearing chamber, the liquid column therein will continue to support the lubricant within the uppermost end of the cup even though subsequent leakage of lubricant from the cup should occur.

This feature is of particular importance in cases where the bearing chamber may be located above the standing level of liquid within the well, or at least located in the position such that the well liquid possibly may temporarily fall below the level or height of the bearing chamber. For example, supposing that the standing level of the well liquid should fall so low that the pump would not, at least temporarily, take suction, and the well liquid therefore would fall below the upper bearing chamber 16. By providing an enclosed bearing chamber capable of supporting a liquid column extending above the lubricant space containing the bearing, it is assured that the lubricant will be held in proper place by the gravity pressure of the column, even though the pump be operated for a considerable period of time without the well liquid rising to such a point as to replenish the liquid in the bearing chamber surrounding the seal cup. And as previously mentioned, even though leakage of lubricant from within the seal cup should occur, the liquid column outside of the seal cup will continue to hold the lubricant in its proper place because of the fact that said column extends some distance above the upper end of the lubricant chamber or space.

In the intermediate type of bearing construction shown in Fig. 2, there might exist, in the absence of a counterbalancing pressure on the lubricant contained in the bearing chamber, a tendency for the well liquid to leak upwardly about shaft 25 and sleeve 38, and then overflow the upper edge of the latter so as to displace lubricant in the bearing chamber. Thus should the pressure at the outside of skirt 43, acting to support the lubricant therein around the bearing, be less than the pressure of well liquid tending to leak upward around the shaft and tending to displace the lubricant out of the bearing chamber toward the outside of skirt 43, the lubricant would eventually become so displaced by upward leakage around the shaft. However, in the event of such leakage around the shaft, an equalized or counterbalancing pressure will be set up in the chamber at the outside of skirt 43 by virtue of leakage between cap 30 and wall 34 at their engaging ends. That is, leakage will occur between these members to the point at which the pressure therein, acting to support the column of lubricant within skirt 43, will eventually be substantially equal to the pressure tending to cause leakage into the bearing chamber between the shaft and sleeve 38.

Since the intermediate bearing shown in Fig. 2 is located at the upper discharge end of the pump, it will be seen that the pressure in passage 36 is equal to the pumping column pressure, or in other words the pressure head against which the pump is operating. This being the case, the pressure which will develop within the chamber defined by wall 34 and cap 30, as a result of leakage therebetween, will likewise equal substantially the pressure head against which the pump is operating. Shoulder the bearing be located at 18 immediately above the lowermost impeller bowl 17, the pressure in the bearing chamber would in that case equal the pumping head developed by the lowermost unit 17. The bearing structure thus may be located in the pumping column or pump discharge passage at a point at which the pressure will exceed the static pressure of the column of liquid standing in the well above the bearing, at the outside of the pump. The pressure existing in the bearing chamber in Fig. 2 will therefore exceed the pressure maintained in the lower bearing chamber, shown in Fig. 4, which is located below the suction intake of the pump. In the latter case, the pressure communicated to the column of liquid within casing 34 by leakage through the shaft passing opening in its upper end, will equal substantially the static pressure at the point of the column of liquid standing in the well, since the well liquid at the point of entry into the bearing chamber is at well or pump suction pressure. As previously stated however, the pressure in the bearing chamber of the intermediate bearing structure obviously will be greater than the well column pressure at that point, and will be determined substantially in accordance with the pressure developed by the pump units therebelow.

Inasmuch as it is usually preferable to assemble the pump section 14 in the factory before shipping, and inasmuch as shipping this pump section in a vertical position would be prohibitive, I prefer to ship the pump unit 14 completely filled with a lubricating medium. This I accomplish by inserting a plug in the opening normally occupied by the screen 20 and another plug closing the upper end of the collar 15. A third plug is inserted in the by-pass opening 70. Thus, the entire structure is fluid-tight and may be filled with lubricating medium and shipped without danger of the medium in the bearing chambers 40 leaking therefrom.

In Fig. 7, I show an alternative form of my invention wherein a bearing 75 is mounted in a bearing chamber 76. The line shaft 25 extends upward through a sleeve 78 supported in a projection 80 of this bearing structure. An impeller 81 secured to the shaft above this alternative form of bearing structure has a downward extending shroud 82 which surrounds the sleeve 78 but is separated therefrom by a clearance space or chamber 83, this clearance space extending outward between the lower end of the shroud 82 and the upper end of the projection 80. In this form of the invention this impeller shroud performs the function of the member 42 shown in the preferred form of the invention.

The bearing chamber 76 is completely filled with a lubricating medium which may work its way between the shaft 25 and the sleeve 78, reaching the clearance space 83. The fluid in the well also has access to this clearance space 83. The well-fluid cannot rise in the vertical portion of this clearance space, being of higher density than the lubricating medium, this lubricating medium in the clearance space 83 being relatively incompressible. This medium is entrapped in the upper portion of the clearance space 83 due not only to the journalling engagement between the sleeve 78 and the shaft 25, but also to the fact that the bearing chamber 76 is completely filled with lubricating medium which is relatively incompressible.

It should be noted that both the preferred and alternative forms of my invention preclude any of the well-fluid from reaching the bearing. Furthermore, each of these forms of invention keeps any foreign particles from the bearing which might be carried by the well-fluid. Thus, in the preferred form any particles entering the bearing chamber which are deposited in the lower end thereof cannot rise to cause undue wear on the bearing 51. In the alternative form of the invention there is no flow of well-fluid upward in the clearance space 83 and thus no tendency for the foreign particles to be carried therethrough to injure either the sleeve bearing 78 or the ball bearing 75.

It should be understood that my invention is not limited to the deep-well turbine art, but finds utility in any art where it is necessary to journal a shaft at a position which is submerged below the surface of a fluid, whether this fluid be a liquid or a gas which might be harmful to the bearing should it come in contact therewith.

I claim as my invention:

1. In a bearing structure, the combination of: a cap; a stationary cylinder wall; means for retaining said cap and said cylinder wall together to define a chamber containing a lubricating medium; a shaft extending into said chamber through said cap, said shaft being rotatable within said cap, said chamber being provided with an opening through which external fluid is admissible thereto; a bearing in said chamber for journalling said shaft; and means for preventing any external fluid from reaching said bearing.

2. In a submersible pump adapted to pump a fluid, the combination of: a pump section including a bearing structure formed of inner and outer members, there being a discharge passage between said members, said inner member defining a bearing chamber; a shaft extending into said bearing chamber; a bearing in said bearing chamber and journalling said shaft; a member in the form of an inverted bell positioned in said bearing chamber and secured to said shaft to extend downward around said bearing, the upper part of said bell entrapping a relatively incompressible lubricating medium for lubricating said bearing, said bearing chamber at the exterior of said bell being communicable with the fluid in said discharge passage whereby said fluid and said lubricating medium are in pressure-transferring relationship; and means associated with said shaft for pumping fluid through said discharge passage.

3. In a bearing structure submerged in a fluid, the combination of: walls defining a substantially closed lubricant containing bearing chamber, the upper end wall of said bearing chamber having an opening through which well liquid is accessible to said chamber; a shaft extending into said bearing chamber through said opening; bearing means in said bearing chamber for journalling said shaft; and seal means in said bearing chamber and associated with said shaft for preventing any of said fluid entering between said shaft and the walls of said opening from reaching said bearing, said opening in the bearing chamber walls being a substantial distance above said seal means and said opening being substantially smaller than the horizontal cross sectional area of said chamber.

4. In a bearing structure submerged in a fluid, the combination of: walls defining a substantially closed bearing chamber, the upper end wall of said bearing chamber having an opening through which well liquid is accessible to said chamber; a shaft extending into said bearing chamber through said opening; bearing means in said bearing chamber for journalling said shaft; and a member rotating with said shaft and extending downward around said bearing means and containing a body of lubricating medium which prevents any of said fluid entering said bearing chamber at the junction of said shaft and said walls from rising in said member to contact said bearing means, said opening in the bearing chamber walls being a substantial distance above said seal means and said opening being substantially smaller than the horizontal cross sectional area of said chamber.

5. In a bearing structure submerged in a fluid, the combination of: walls defining a substantially closed bearing chamber, the upper end of said bearing chamber wall having an opening; a shaft extending into said bearing chamber through said opening; bearing means in said bearing chamber for journalling said shaft; an apron member secured to said shaft and extending downward around said bearing means and entrapping a body of lubricating medium in the upper end thereof which medium is in pressure-transferring relationship with said fluid; and a stationary sleeve member extending upward inside said apron for supporting said bearing means, said opening in the bearing chamber walls being a substantial distance above said seal means and said opening being substantially smaller than the horizontal cross sectional area of said chamber.

6. In a bearing structure submerged in well liquid, the combination of: walls defining a substantially closed bearing chamber, the upper end of said bearing chamber wall having an opening; a shaft extending into said bearing chamber through said opening; an inverted bell member secured to said shaft and including an apron extending downward around said shaft in spaced relationship in a manner to entrap a body of lubricating medium, said lubricating medium being in pressure-transferring relationship with said fluid; and a stationary sleeve member journalling said shaft and extending upward inside said bell member, the lower end of the bore of said sleeve member communicating with the well liquid; said opening in the bearing chamber walls being a substantial distance above said seal means and said opening being substantially smaller than the horizontal cross sectional area of said chamber.

7. A combination as defined in claim 6 in which said bearing chamber is communicable with the fluid outside of said bearing structure through said opening, and including means surrounding said shaft and partially closing the opening for retarding the entrance of said fluid into said bearing chamber.

8. In a bearing structure adapted to be submerged in a fluid, the combination of: a shaft; a member secured in fluid-tight relationship with said shaft and rotating therewith, said member including an apron extending downward around said shaft in spaced relationship therewith and including a cylindrical member extending downward around said shaft inside said apron, the upper ends of said apron and said cylindrical member being joined in fluid-tight relationship to form an annular chamber spaced from said shaft and filled with a lubricating medium of less density than the density of said fluid, said fluid being in pressure-transferring relationship with said lubricating medium; a bearing means positioned in said annular chamber; and a sleeve member extending upward into said annular chamber and engaging said bearing means.

9. In a bearing structure, the combination of: walls forming a substantially closed bearing chamber, said bearing chamber containing a lubricating medium; a shaft extending into said bearing chamber through an end wall thereof; a bearing in said bearing chamber, said bearing journalling said shaft; and a member in said bearing chamber and secured in fluid-tight relationship with said shaft, said member extending downward around said bearing to entrap a body of lubricating medium around said bearing, and said bearing chamber walls extending a substantial distance above said member.

10. In a submersible pump adapted to pump a well liquid, the combination of: a pump section; walls forming a substantially closed bearing chamber in said pump section, said bearing chamber containing a lubricating medium and being accessible by the well liquid; a bearing supported in said bearing chamber; a shaft in said section and extending through an opening in the upper end wall of said chamber, said shaft journalling in said bearing; an impeller carried by said shaft; and seal means for preventing said fluid from reaching said bearing, the walls of said chamber substantially enclosing said seal means and said opening in the wall of said chamber being a substantial distance above said seal means.

11. In a bearing structure, the combination of: walls forming a bearing chamber, said bearing chamber containing a lubricating medium; a shaft extending into said bearing chamber through an end wall thereof: a bearing mounted in fixed position in said bearing chamber; a member secured to said shaft, said member being in journalling relationship with said bearing; and an apron extending downward around said member to form a trap about said bearing.

12. A combination as defined in claim 11 in which said bearing is set in an inverted cup formed by said member, and in which said apron extends to a point below said bearing.

13. In a submersible well pump bearing structure, the combination of: walls forming an inverted cup; a shaft passing in fluid-tight relationship with the upper wall of said cup, there being a space between said shaft and the walls of said cup in which is entrapped a body of lubricating medium in surface contact with well liquid of greater density at a surface in the lower part of said inverted cup, said fluid entrapping said lubricating medium in said cup; a bearing in said space; and a chamber formed by walls substantially enclosing and extending above said cup, said shaft extending through an opening in the upper end of said chamber wall, said opening being a substantial distance above said cup, a restricted flow of well liquid being permitted into said chamber by way of said opening.

14. In a device of the character described adapted to be submersed in a well liquid, the combination comprising, walls forming a substantially closed chamber, a shaft extending into said chamber through an opening in the upper end thereof, well liquid being exclusively and restrictedly admissible to said chamber through said opening, a tubular member within said chamber and extending upwardly around said shaft, and means confining a liquid lubricant around the upper end of said tubular member, said opening being directly above said means and the opening being substantially smaller than the horizontal cross sectional area of said chamber.

15. In a device of the character described adapted to be submersed in a well liquid, the combination comprising, walls forming a substantially closed chamber, a shaft extending into said chamber through an opening in the upper end thereof, well liquid being exclusively and restrictedly admissible to said chamber through said opening, a tubular member within said chamber and extending upwardly around said shaft, and an inverted cup carried on said shaft and extending over and around the upper end of said tubular member, said cup containing a lubricant held upwardly therein by the pressure of a column of liquid within said chamber extending above and at the outside of said cup, said opening being directly above said cup and the opening being substantially smaller than the horizontal cross sectional area of said chamber.

16. In a device of the character described adapted to be submersed in a well liquid, the combination comprising, walls forming a substantially closed chamber, a shaft extending into said chamber through openings in the upper and lower end walls of said chamber and through which said shaft extends, well liquid being exclusively and restrictedly admissible to said chamber through the upper of said openings, a sleeve within said chamber and extending upwardly around said shaft, and an inverted cup carried on said shaft and extending over and around the upper end of said sleeve, said cup containing a lubricant held upwardly therein by the pressure of a column of liquid within said chamber extending above and at the outside of said cup, the upper of said openings being directly above said cup and the opening being substantially smaller than the horizontal cross sectional area of said chamber.

17. In well pumps or the like, the combination comprising, means forming a lubricant containing space, and means communicable with said space and with the well liquid only at a point a substantial distance above said space, for supporting a liquid column substantially closed from the well liquid and of predetermined height, said liquid column extending from a point below the top of said lubricant containing space to a point above said space so as to exert by gravity a pressure on the lubricant therein.

18. In well pumps or the like, the combination comprising, means forming a lubricant containing space, a tubular member forming a chamber communicating with said space and containing a column of liquid substantially closed from the well liquid and of predetermined height, said member having a well liquid inlet only at a point a substantial distance above said lubricant containing space and said liquid column extending from a point below the top of said space to a point above said space, so as to exert by gravity a pressure in the lubricant therein.

19. In well pumps or the like, the combination comprising, means forming a lubricant containing space, and means communicable with said space and with the well liquid for supporting a liquid column substantially closed from the well liquid and of predetermined height, said liquid column extending from a point below the top of said lubricant containing space to a point above said space so as to exert by gravity a pressure on the lubricant therein, well liquid being admissible to said liquid column only at a point above said lubricant containing space.

20. In a device of the character described adapted to be submersed in a well liquid, the combination comprising, walls forming a substantially closed chamber, a shaft extending into said chamber through an opening in the upper end thereof, the area of said opening being substantially smaller than the horizontal cross sectional area of said chamber, well liquid being restrictedly admissible to said chamber through said opening, a tubular member within said chamber and extending upwardly around said shaft, and means confining a liquid lubricant around the upper end of said tubular member; well liquid being admissible to said chamber only at a substantial distance above said lubricant confining means.

21. In a well pump structure, means forming a lubricant containing chamber adapted to be submerged beneath the level of the well liquid, means communicable with said space and with the well liquid for supporting a liquid column substantially closed from the well liquid and extending above said lubricant containing chamber so as to exert a pressure on the lubricant therein, said column being supported independently of the well liquid, and the liquid in said column being at a pressure greater than the static pressure of the liquid in the well standing above said chamber.

In testimony whereof, I have hereunto set my hand at Los Angeles, California, this 16th day of March, 1928.

JOHN A. WINTROATH.